United States Patent [19]

De Biasi

[11] Patent Number: 4,477,758
[45] Date of Patent: Oct. 16, 1984

[54] STEPPING MOTOR OVERCURRENT DETECTION AND PROTECTION DEVICE

[75] Inventor: Mark S. De Biasi, Windsor, Conn.
[73] Assignee: The Superior Electric Company, Bristol, Conn.
[21] Appl. No.: 503,246
[22] Filed: Jun. 10, 1983
[51] Int. Cl.³ .............................................. H02K 29/04
[52] U.S. Cl. .................................... 318/696; 318/685; 361/31
[58] Field of Search .................. 318/696, 685; 361/28, 361/31, 93, 94

[56] References Cited
U.S. PATENT DOCUMENTS
4,177,492 12/1979 Noddings et al. .................... 361/31

Primary Examiner—J. V. Truhe
Assistant Examiner—Saul M. Bergmann
Attorney, Agent, or Firm—John H. Crozier

[57] ABSTRACT

An overcurrent detection and protection device for stepping motors has means for detecting an overcurrent condition in the power supply to a stepping motor. Means responsive to the detecting means rapidly provides a signal to the stepping motor drive system causing the current to terminate and to remain terminated for a predetermined interval of time, at the end of which interval the device resets itself causing the current to resume. The device is sufficiently fast-acting to protect electronic components such as transistors.

4 Claims, 2 Drawing Figures

STEPPING MOTOR OVERCURRENT DETECTION AND PROTECTION DEVICE

This invention relates to overcurrent detection and protection in stepping motor drive electrical systems having current control means and particularly to a device that, inter alia, is sufficiently fast-acting to protect electronic components such as transistors.

The use of devices such as fuses and circuit breakers is well known for protection against overcurrent conditions; however, these devices are too slow-acting to protect electronic components such as transistors, that respond extremely rapidly to changes in the level of electrical signals and thus can be damaged quickly in the event of an overcurrent condition. Additionally, these devices are not conveniently self-resetting after an overcurrent condition is terminated.

Accordingly, it is an object of this invention to provide an overcurrent detection and protection device for stepping motor drive systems that is sufficiently fast-acting to protect electronic components such as transistors.

It is a further object of this invention to provide an overcurrent protection device for stepping motor drive systems that is self-resetting a predetermined interval of time after the termination of an overcurrent condition, which interval of time may be relatively short.

An additional object of this invention is to provide an overcurrent protection device for stepping motor drive systems that has few components and that can be integrated easily into an electronic circuit.

In carrying out the invention, means are provided to sense an overcurrent condition in the power line to the stepping motor drive system to be protected. The output of the current sensing means triggers a current interruption circuit which rapidly acts upon the current controlling means in the drive system. The current interruption circuit also continues to signal an overcurrent condition for a predetermined period of time and then resets itself to its non-overcurrent state.

Although the invention is described as applied to the protection of an electronic drive circuit for a stepping motor, it will be understood that it is applicable to other circuits which include means to control DC power to an electrical load.

Stepping motors and control circuitry of the type under consideration here are well known and are described, for example, in U.S. Pat. Nos. 3,117,268 and 4,208,623. Reasons for overcurrent conditions in such motors include winding to winding shortcircuit, winding to motor shell shortcircuit, and drive circuit component failure.

IN THE DRAWING

Figure 1:
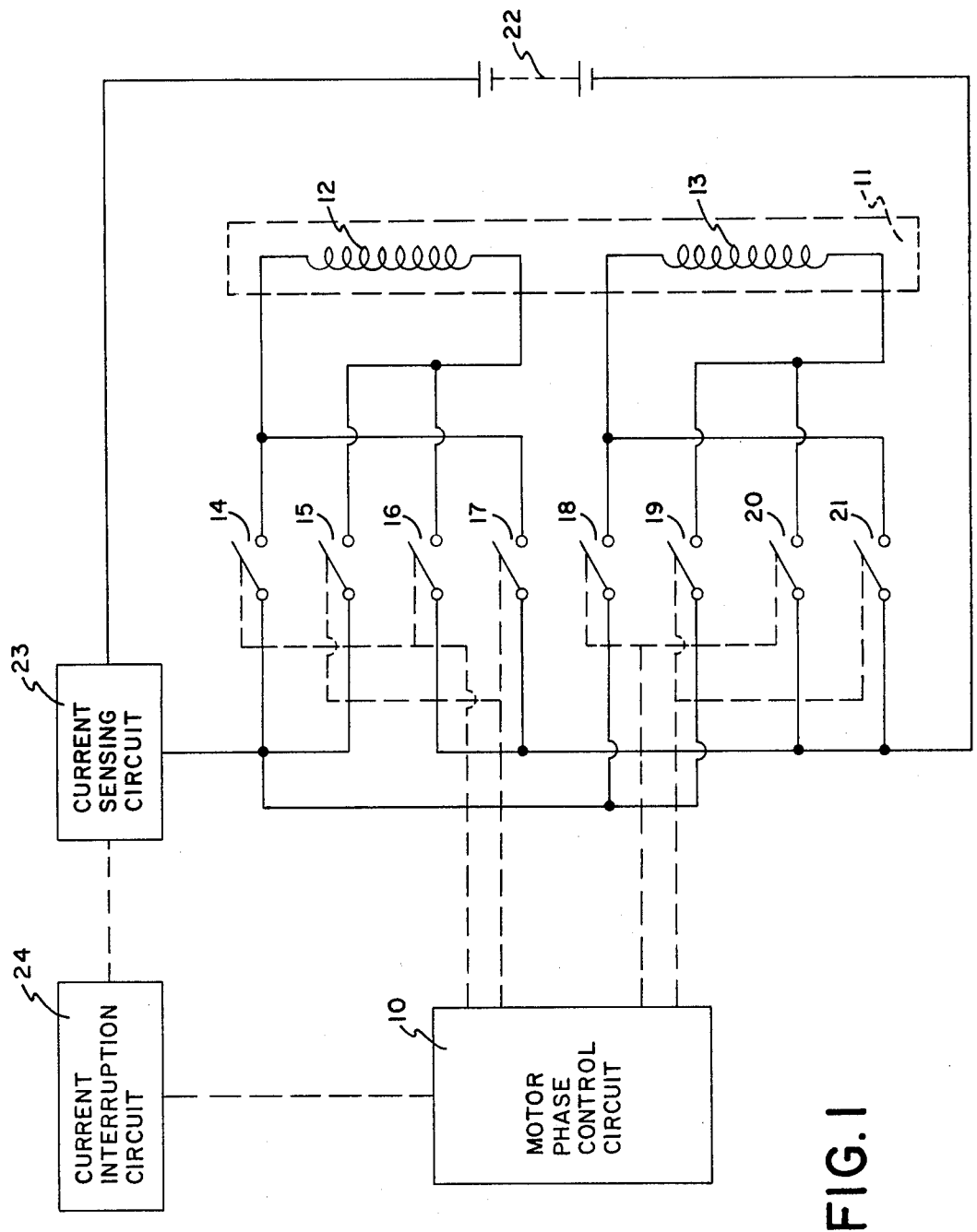
FIG. 1 is a block and electrical schematic of a stepping motor drive incorporating the present invention.

Referring to FIG. 1, the output of a motor phase control circuit 10 is employed to cause the energization of the windings of a motor 11, with the windings being indicated by the reference numerals 12 and 13. In order to enable independent energization of the windings and to allow reversal of polarity of each winding there are provided switches 14, 15, 16, 17, 18, 19, 20 and 21 electrically connected in the manner shown to the ends of the windings 12 and 13 and to a power source of unidirectional polarity 22.

To achieve stepping of the motor 11, the switches 14, 15, 16, 17, 18, 19, 20, and 21 are sequentially closed and opened in pairs by the motor phase control circuit 10 which may be programmed to produce specific stepping action of the motor or which may receive continuous or intermittent command signals. In energizing winding 12, for example, the switches 14 and 16 would be closed to produce one polarity, and to obtain the opposite polarity, the switches 14 and 16 would be opened while the switches 15 and 17 would be closed. Likewise, for the winding 13, the switches 18 and 20 and the switches 19 and 21 would be opened and closed in their respective pairings.

The flow of current to the motor 11 is detected by a sensing circuit 23 and when the current exceeds a predetermined value, a current interruption circuit 24 connected between the sensing circuit 23 and the control circuit 10 causes the current to be interrupted.

Figure 2:
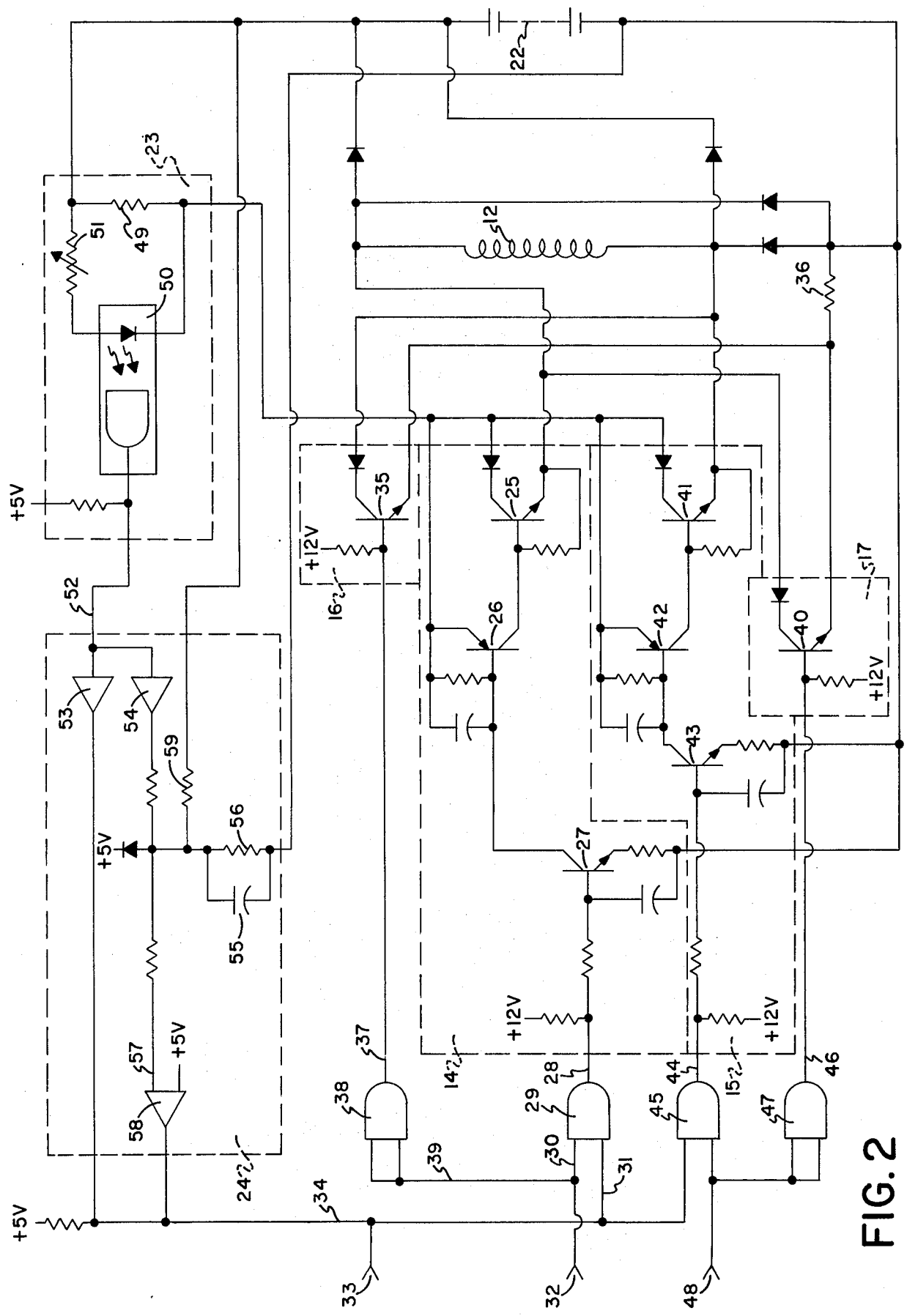
FIG. 2 is an electrical schematic of the present invention and a portion of the motor drive for one winding of the motor.

Referring to FIG. 2, which shows the current sensing and current interruption circuits 23 and 24, respectively and the switching circuitry associated with the winding 12, the switch 14 includes a transistor 25 having its emitter connected to one end of the winding 12, while its collector is connected to the positive side of the power source 22. The base of the transistor 25 is connected to a base drive circuit which includes transistors 26 and 27 connected in the manner shown and which is responsive to a voltage on lead 28. A high voltage on the lead 28 causes the transistor 25 to conduct, while a low voltage effects nonconduction of the transistor 25.

The lead 28 is connected to the output of an open collector AND gate 29 which receives on one input 30 a signal provided at terminal 32. The other input to the gate 29 is connected to terminal 33 and lead 34. The terminal 33 is connected to a current chopping circuit in the motor phase control circuit 10 shown on FIG. 1 and the terminal 32 is connected to a phase selection circuit in the motor phase control circuit. The lead 34 is connected to the output of the current interruption circuit 24. When a high signal is present on the terminals 32 and 33 and on the lead 34, the gate 29 will produce a high voltage on lead 28 and cause the transistor 25 to conduct.

The switch 16 includes a transistor 35 having its emitter connected through a resistor 36 to the negative side of the power source 22. The resistor 36 is a current sensing element in the current chopping circuit of the motor phase control circuit 10 shown on FIG. 1. The base of the transistor 35 is connected to a lead 37 a high signal on which causes the transistor to conduct. The lead 37 is connected to the output of AND gate 38 the inputs of which are both connected to a lead 39. When there is a high signal on the lead 39 connected to terminal 32, the gate 38 will produce a high voltage on the lead 37 and cause the transistor 35 to conduct.

Thus, when there is a high signal at terminals 32 and 33 and on lead 34, the gates 29 and 38 will produce high output voltages, causing the transistors 25 and 35 to conduct, thereby creating a current path from the positive side of the power source 22, through the transistor 25, the coil 12, the transistor 35, the resistor 36, and thence to the negative side of the power source.

While the above description has related to the switches 14 and 16 and the circuitry associated therewith, the switches 15 and 17 and the circuitry associated therewith are identical, respectively. The switch 17 includes a transistor 40 identical to the transistor 35 and the switch 15 includes a transistor 41 identical to the transistor 25 and a base drive circuit including transistors 42 and 43 identical to the transistors 26 and 27 respectively. The switch 15 is responsive to a high signal on a lead 44 connected to the output of an open collector AND gate 45 and the switch 17 is responsive to a high signal on a lead 46 connected to the output of an AND gate 47.

One input of the AND gate 45 is connected to the lead 34 and the input 33 and the other input is connected to a terminal 48. Both inputs of the AND gate 47 are connected to the terminal 48. When high signal levels exist on the lead 34 and the terminals 33 and 48, switches 15 and 17 will close to allow current to flow through the winding 12, although in the opposite direction of the current flow caused by the closing of switches 14 and 16; but, if a low signal level exists on the lead 34, the terminal 33, and/or the terminal 48, one or both of switches 15 and 17 will open and interrupt the current path.

All current from the power source 22 to the coil 12 passes through a resistor 49 across which is developed a voltage drop proportional to the flow of current. Connected in parallel with the resistor 49 is a photon coupled isolator 50. A variable resistor 51 is connected in series with the isolator 50. The output of the isolator 50 is connected through lead 52 to an open collector TTL driver 53 in the current interruption circuit 24, while the output of the driver 53 is connected to the lead 34. The lead 52 is also connected to an open collector TTL driver 54 the output of which is connected to the negative side of the power supply 22 through an electrolytic capacitor 55 and a parallel resistor 56 and is connected to one input 57 of an open collector comparator 58 which has a positive five-volt reference voltage at the second input. The output of the comparator 58 is connected to the lead 34. The positive terminal of the capacitor 55 is connected through a resistor to the positive side of the power supply 22. The power supply 22 for this application typically has an output potential in the range of 24 to 48 volts.

The resistor 51 is adjusted such that when the current through the resistor 49 causes a predetermined voltage drop across that resistor to be reached, the output of the isolator 50 switches from a high to a low level, which low level in turn results in a low level output from the driver 53 to the lead 34. The low signal in the lead 34 in turn causes the switches 14 and 15 to open if either of those switches is closed, resulting in shutdown of current from the power source 22.

A low output of the isolator 50 also causes the output from the driver 54 to switch from a high to a low level, resulting in the discharging of the capacitor 55. When the voltage at input 57 to comparator 58 drops to less than five volts positive, the output of the comparator drops to a low level.

With the current removed from the resistor 49, the output of the isolator 50 switches to a high state and the outputs of the drivers 53 and 54 also switch to high states. The comparator 58 remains at a low state, however, for the period of time necessary for the capacitor 55 to recharge from the power source 22 through the resistor 59 to a potential sufficient to cause a voltage of greater than five volts positive at input 57 to the comparator. Thus, lead 34 will remain at a low level, causing switches 14 and 15 to remain open for an interval determined by the sizing of the components. For the application described, a satisfactory interval can be achieved when the capacitor 55 is on the order of one microfarad, the resistor 59 is on the order of 402 kilohms, and the resistor 56 is on the order of 133 kilohms. The interval selected for any application will depend on the duty cycle ratings of the components to be protected.

When lead 34 regains a high state, the operation of the switches 14, 15, 16 and 17 will be governed by the inputs at terminals 32, 33, and 48. If the cause of the overcurrent condition is still present, the shutoff cycle will repeat and continue to do so, resulting in a series of current spikes separated by intervals of no current. However, the components of the motor drive are protected because of the rapid response of the invention. In the case of the circuit shown, the response time is on the order of about 2 microseconds. The response time for other applications, of course, will depend not only on the components selected for the invention but also in part on the components in the electrical apparatus being protected.

The foregoing discussion has related, for convenience, solely to the invention as applied to the winding 12. The winding 13 is energized identically as the winding 12, but by means of drive circuitry separate from that shown on FIG. 2. Overcurrent protection for the winding 13 may be effected by a connection from the lead 52 to a separate current interruption circuit provided for the winding 13.

It will accordingly be understood that there has been disclosed an overcurrent detection and protection device for stepping motor drive systems that is sufficiently fast-acting to protect electronic components such as transistors, that is self-resetting after the termination of an over-current condition, that has few components, and that can be integrated easily into an electronic circuit.

Since certain changes may be made in carrying out the above-described invention without departing from the scope thereof, it is intended that all matter contained in the above description or shown in the accompanying Drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. An overcurrent detection and protection device for a stepping motor drive system, the system having means for controlling the current flow thereto, comprising:
(a) a first resistor through which the current flow passes and across which a voltage drop proportional to the current flow is developed;
(b) a photon coupled isolator connected in parallel with the first resistor and having an output signal, which output signal changes level when the voltage drop across the first resistor reaches a predetermined level;
(c) a signal means responsive to the detecting means for producing a signal to the current controlling means upon an overcurrent condition, causing the current controlling means to terminate the overcurrent condition;
(d) delay means for maintaining the signal to the current controlling means for a predetermined length of time and subsequently resetting the device to its state existing prior to the overcurrent condition; and (e) a second resistor connected in series with the isolator, which second resistor is adjustable to vary the response level of the isolator to the voltage drop across the first resistor.

2. An overcurrent detection and protection device, as defined in claim 1, further defined when the current controlling means is responsive to high and low input signals, a low input signal causing the current controlling means to terminate an overcurrent condition, the signals means comprises:

a first open collector TTL driver responsive to the sensing means, the output of the driver providing a low signal to the current controlling means upon an overcurrent condition.

3. An overcurrent detection and protection device, as defined in claim 1, further defined when the current controlling means is responsive to high and low input signals, a low input signal causing the current controlling means to terminate an overcurrent condition, the delay means comprises:

(a) an open collector comparator, having an output connected to the current controlling means and having first and second inputs, the first input connected to a reference voltage source, the comparator producing a low output signal when the reference voltage exceeds the voltage of the second input;

(b) a capacitor, being connected to a power source for charging and having its positive terminal connected to the second input of the comparator and having a potential, when charged, greater than the reference voltage at the first input of the comparator; and (c) a second open collector TTL driver, having its output connected to the second input of the comparator and to the positive terminal of the capacitor and having its input responsive to the detecting means; so that when an overcurrent condition exists, the output of the driver drops to a low state, causing the capacitor to discharge to a potential lower than that of the reference voltage at the second input of the comparator, the output of the driver providing a low signal to the current controlling means and maintaining the low signal for the period of time necessary for the capacitor to recharge to a potential greater than the reference voltage.

4. An overcurrent detection and protection device, as defined in claim 2, further defined when the current controlling means is responsive to high and low input signals, a low input signal causing the current controlling means to terminate an overcurrent condition, the delay means comprises:

(a) an open collector comparator, having an output connected to the current controlling means and having first and second input, the first input connected to a reference voltage source, the comparator producing a low output signal when the reference voltage exceeds the voltage of the second input;

(b) a capacitor, being connected to a power source for charging and having its positive terminal connected to the second input of the comparator and having a potential, when charged, greater than the reference voltage at the first input of the comparator; and (c) a second open collector TTL driver, having its output connected to the second input of the comparator and to the positive terminal of the capacitor and having its input responsive to the detecting means; so that when an overcurrent condition exists, the output of the driver drops to a low state, causing the capacitor to discharge to a potential lower than that of the reference voltage at the second input of the comparator, the output of the driver providing a low signal to the current controlling means and maintaining the low signal for the period of time necessary for the capacitor to recharge to a potential greater than the reference voltage.

* * * * *